L. JARUSZ.
FLOOR WASHING MACHINE.
APPLICATION FILED APR. 26, 1917.
1,329,604.
Patented Feb. 3, 1920.
2 SHEETS—SHEET 1.
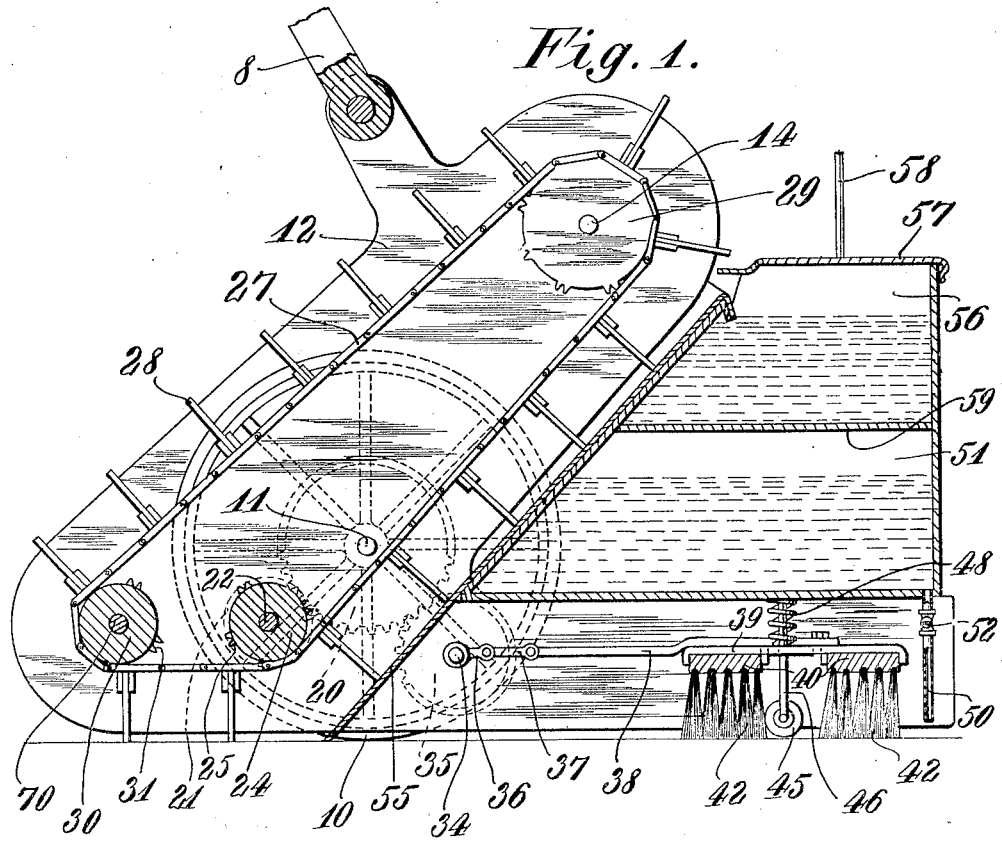
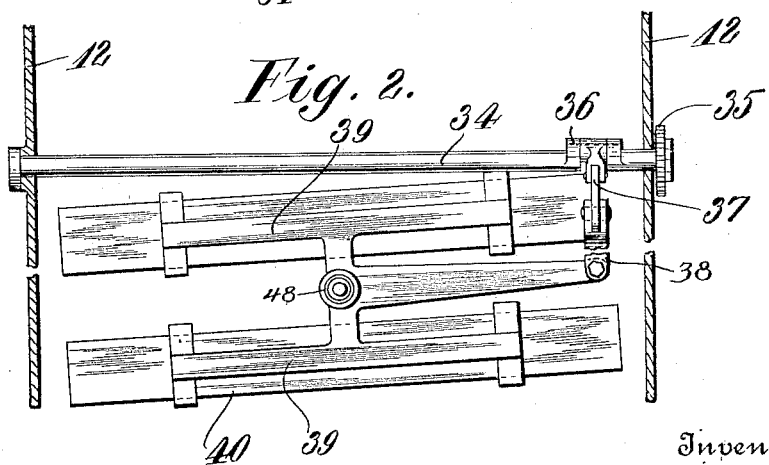
Inventor
Leon Jarusz.
By his Attorney
Oscar Geier

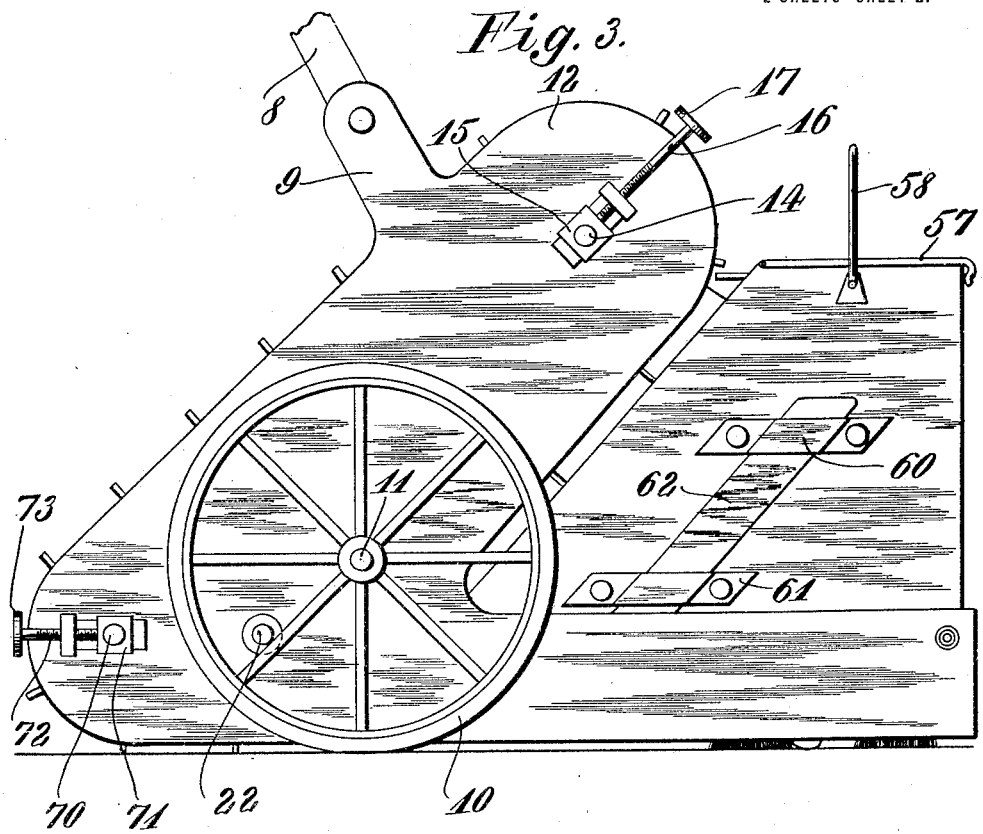

UNITED STATES PATENT OFFICE.

LEON JARUSZ, OF MILWAUKEE, WISCONSIN.

FLOOR-WASHING MACHINE.

1,329,604.  Specification of Letters Patent.  Patented Feb. 3, 1920.

Application filed April 26, 1917. Serial No. 164,867.

*To all whom it may concern:*

Be it known that I, LEON JARUSZ, a citizen of the United States, resident of Milwaukee, county of Milwaukee, and State of Wisconsin, have invented certain new and useful Improvements in Floor-Washing Machines, of which the following is a specification.

This invention relates to improvements in floor scrubbing machines, and has as its principal object the provision of means which may be manually operated over floors, sidewalks, and the like, whereby the same are cleansed of any accumulations thereon.

A further object is to provide means whereby the surface is given a thorough scrubbing by brushes applied in the manner of a mop, the same being moistened to any desired extent as the operation proceeds.

These and other like objects are attained by the novel construction and combination of parts hereafter described and shown in the accompanying drawings, forming a material part of this specification, and in which:—

Figure 1 is a vertical sectional view taken through the center of the machine.

Fig. 2 is a fragmental plan view showing the brushes and operating means.

Fig. 3 is a side elevational view of the complete machine.

This apparatus, which is adapted for manual propulsion by the handle 8, attached to the projection 9 formed with the frame sides 12, rests upon a pair of relatively large wheels 10, affixed at the ends of the main shaft or axle 11 upon which the frame sides are mounted, another shaft 14 being rotatably mounted in bearings 15 adjustable in the frame sides 12 by means of the screws 16 and hand wheels 17.

Rigidly secured to the shaft 11 is a spur gear 20, meshing with a pinion 21, affixed upon a transverse shaft 22, upon which is also rigidly mounted the roller 24, carrying the sprocket 25 at its ends over which run the sprocket chains 27, carrying the wiper elements 28, the chains passing upward over the roller 29, secured on the shaft 14 and also around another roller 30 having sprockets 31 at its ends, the arrangement of the shaft 14 being such as to permit the chain to be always maintained in a taut condition, the wipers 28 extending downward so as to make contact with the floor or surface over which it passes.

Also engaged with the spur gear 20 is another spur pinion 35, mounted on a shaft 34, having a crank 36 by which, through the link 37, reciprocating motion is conveyed to the bar 38 engaged with the brush backing carrier 39 carrying the brushes, the bristles 42 of which rest normally upon the floor.

A roller 45, passing between the brushes 42, is engaged with a stem or pin 46 rigidly attached to the bottom of the tank loosely, the upper end of the stem passing through the backing plate 39 and compression spring 48, so that the weight of the front part of the apparatus is largely taken upon the brushes 42 as they are moved over the surface.

Thus the brushes are given reciprocating movement as they are passed over the floor, which is kept moistened in advance by means of the perforated tube 50, communicating with a chamber 51 containing water or other cleansing fluid, the quantity to be dispensed being under control of the valve 52.

A partition plate 55, against which the outer edges of wiper elements make contact, extends diagonally upward from the floor surface to nearly the top of the apparatus to an opening communicating with another chamber 56 formed with the chamber 51 in a removable tank having one obliquely beveled surface resting against the plate 55, the tank being provided with a removable cover 57 and further provided with an operating handle 58 so that the tank as an entirety may be removed for the purpose of cleansing or the like whenever it may be desired, the compartments or chambers 51 and 56 being divided by the horizontal partition 59.

The tank is held in place normally upon the machine by means of looped elements 60 and 61 secured rigidly to its lateral walls and engageable with a plate 62 formed with or secured to the outer front walls 12 of the frame.

In addition to the tightening devices 15, 16 and 17, the roller 30 may be mounted upon a shaft 70 carried in a movable bearing 71, actuated by the screw 72, the same being provided with a hand wheel 73.

In operation, the tank 51 having been filled with water or other cleansing solution, the machine is caused to advance over the surface to be cleansed while the driving wheels 10 impart rotary motion to the gear train, operating the conveyer and wiping elements combined therewith, at the same time causing the brushes to thoroughly scour the surface under pressure of the spring 48, which, as will be noticed, is located centrally of the brush holding frame, thereby pressing the brushes against the surface at all points with uniform force, and it will be clearly understood that the wiper elements 28 are adapted to pass with considerable pressure over the surface so as to cleanse the same and at the same time convey the accumulations into the tank 56, from whence they can be removed as desired.

Having thus described my invention, what I claim as new and desire to secure by Letters Patent, is:—

In a floor washing machine of the character described including a water tank, an H-shaped brush carrier, two brushes carried by said carrier, a roller between said brushes, a stem for said roller extending through said carrier, and a coiled compression spring encircling said stem between said carrier and the bottom of the tank, a bar connected to the center bar of said H-shaped carrier and means connected with said bar for imparting a reciprocating motion to said carrier and its brushes.

In testimony whereof I have affixed my signature.

LEON JARUSZ.